Figure 1:
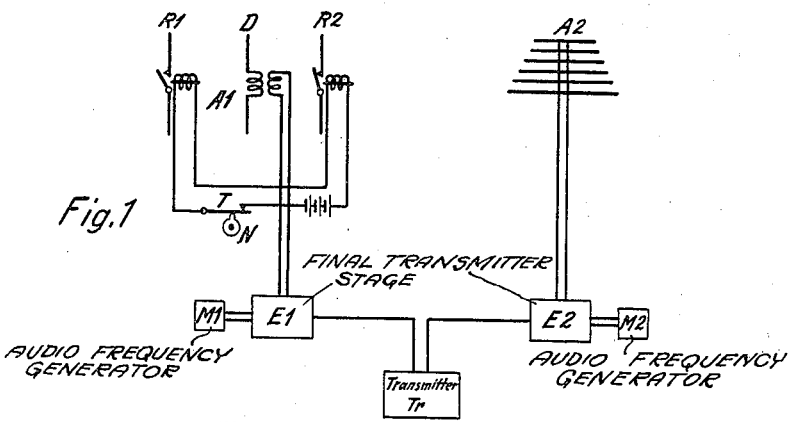

Dec. 23, 1941.   W. M. HAHNEMANN   2,267,468
SYSTEM FOR LANDING AIRCRAFT
Filed Oct. 6, 1937   2 Sheets-Sheet 1

Inventor:
Walter Max Hahnemann
by R. C. Hapgood
Attorney

Dec. 23, 1941.  W. M. HAHNEMANN  2,267,468
SYSTEM FOR LANDING AIRCRAFT
Filed Oct. 6, 1937  2 Sheets-Sheet 2

Inventor:
Walter Max Hahnemann
by R. C. Hopgood
Attorney

Patented Dec. 23, 1941

2,267,468

UNITED STATES PATENT OFFICE 2,267,468

SYSTEM FOR LANDING AIRCRAFT

Walter Max Hahnemann, Berlin-Marienfelde, Germany, assignor to C. Lorenz Aktiengesellschaft, Berlin-Tempelhof, Lorenzweg, Germany, a company Application October 6, 1937, Serial No. 167,509

13 Claims. (Cl. 250—11)

The subject of the invention is a system intended to aid in landing aircrafts. This system makes use of a transmitter for emitting a slipway radiation and of an additional transmitter for emitting a guide beam obtained by a comparison of signal intensities.

Landing systems have been proposed in which a transmitting system for producing the slipway or glide path and a second transmitting system for producing the guide beam are employed. These arrangements are such that the glide path is produced with the aid of a directional ultra-short wave antenna system whereas the guide beam, which indicates to the aircraft the direction of flying towards the airport, is emitted by a long-wave transmitter with a cross-coil arrangement which is keyed in well known alternating fashion. The invention is to simplify landing systems of this kind.

The main feature of the invention is that an ultra-short wave system for emitting the glide path radiation and an ultra-short wave system for emitting the guide beam (run-way localizer beam) are used and that the glide path radiation and the guide beam are polarized differently with respect to each other. Preferably the glide path radiation is polarized horizontally while the guide beam is polarized vertically.

The advantage of arrangements as provided by the invention is that both radiations may be received by a single receiver having antennae polarized differently as stated before. Such different polarization acts to prevent the two radiation patterns from influencing each other. The segregation of the two radiations is obtained with the aid of audible frequencies different from each other.

In order to simplify this system, another feature of the invention proposes to have both radiations caused to operate on waves of the same length.

With a still further simplification in view, it is proposed to employ a single or common high frequency transmitter for feeding the transmitting antenna, used for producing the two radiations, and merely to modulate the two radiations with different audible frequencies in order to distinguish between them. This system may be such, for instance, that in connection with each of the differently polarized radiations a separate final transmitter stage is employed and that in such stages the modulation is effected with separate modulating frequencies.

However, it is not necessary for such common transmitter to comprise two final stages in which the modulation takes place, but the two antenna systems may be fed instead by a single or common final transmitter stage while the separate modulation is effected in the energy line by means of audible frequencies and with the aid of absorption means, as has been repeatedly proposed in connection with the modulation of ultra-short waves.

In accordance with still another feature of the invention the two differently polarized radiations are to operate on neighboring wavelengths, namely wavelengths in immediate neighbourhood of each other. Also here the advantageous use of a single or common high frequency transmitter is possible, this transmitter serving to produce the two neighbouring wavelengths. This arrangement may be such, for instance, that the control stage of the transmitter is modulated and that the two side bands resulting from such modulation are separately used for feeding the two antenna systems. The separate side bands are then each modulated with an audible frequency different from that with which the other of the two side bands is modulated. The construction of the transmitter is such that the side bands are separately amplified in the intermediate stage of the transmitter and conjointly amplified in the final stage thereof. The final stage therefore is possessed of a band width that equals the difference of the two side bands.

The location of the two differently polarized ultra-short wave systems may be such that the guide beam (run-way localizer beam) extends at a certain angle to the glide path radiation in order hereby to obtain an advantageous glide path curve.

The invention is further concerned with the construction of a system for use on board an aircraft in order to receive here the two differently polarized ultra-short wave radiations.

The invention will be understood from the following description and be particularly pointed out in the appended claims, reference being had to the accompanying drawings in which—

Figure 2:
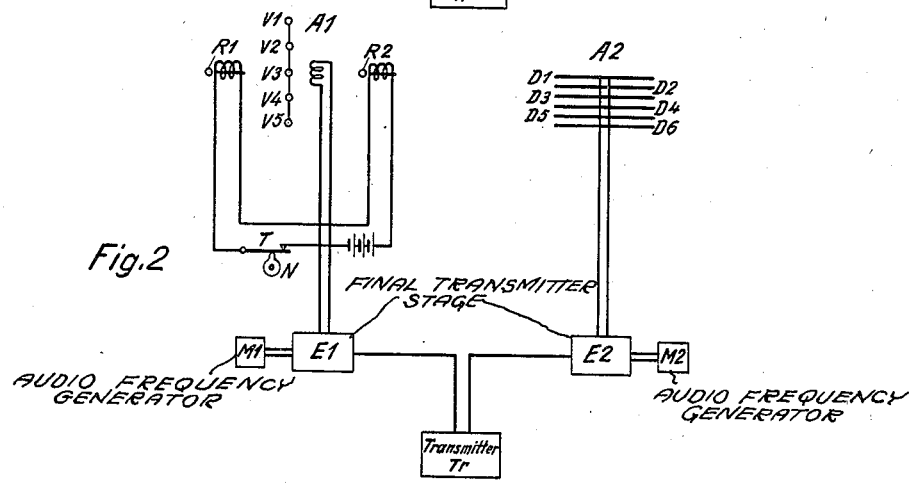
Figure 3:
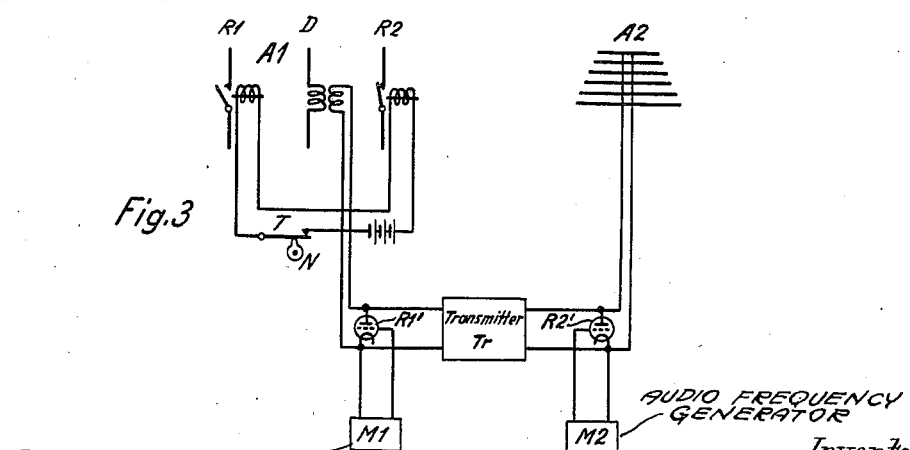
Figure 4:
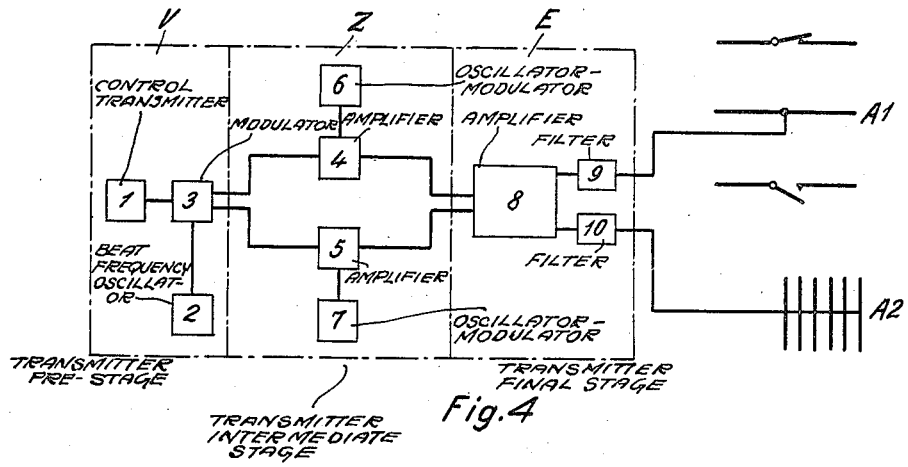
Figure 5:
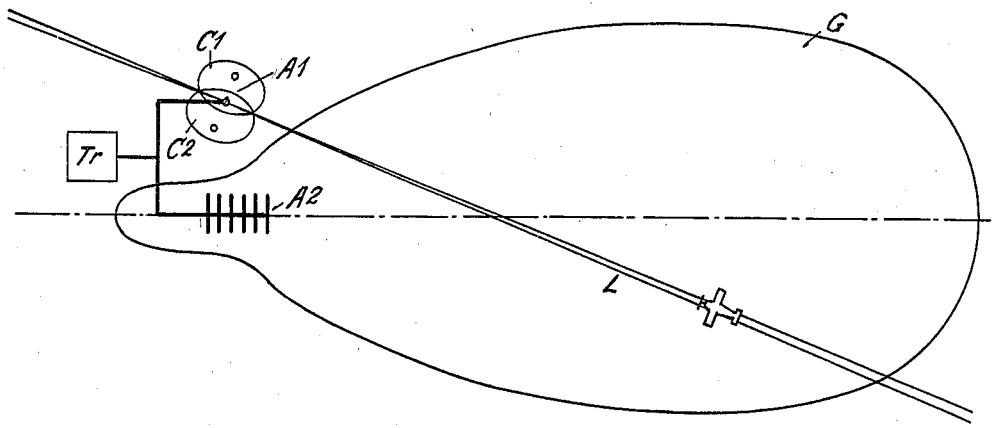
Figure 6:
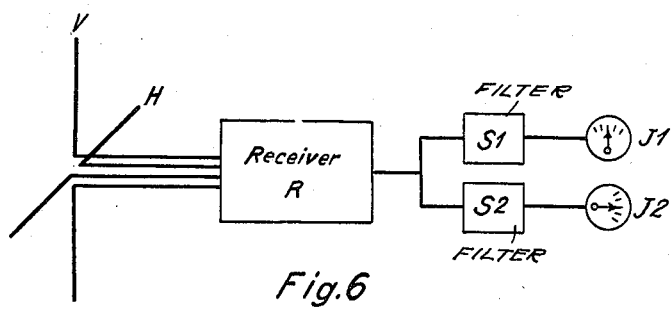

Fig. 1 is a diagrammatic elevation representing a landing system as provided by the invention. Fig. 2 is a view similar to Fig. 1, with the antenna however shown in plan. Fig. 3 is a diagrammatic elevation illustrating a modification of the arrangement represented in Fig. 1. Fig. 4 is a diagrammatic elevation showing still another modification. Fig. 5 is a plan view illustrating the arrangement of the two antenna systems in relation to an airport and also representing the radiation relationships. Fig. 6 is a partially perspective diagrammatic representation of a receiving arrangement adapted to be disposed on an aircraft.

Like reference characters denote like parts throughout the several views.

Reverting to Figs. 1 and 2, A1 denotes the ultra-short wave antenna system used for emitting a vertically polarized run-way localizer beam while A2 indicates the antenna system employed for emitting a horizontally polarized glide path radiation. Both systems are energized by the same wavelength, for example, produced by a transmitter Tr common to them. The high frequency oscillation generated in transmitter Tr passes into the final transmitter stages E1, E2 and thence over feed lines to the antenna systems. In the stages E1, E2 the two radiations are modulated with different modulating frequencies $f1$, $f2$ which are produced in low frequency generators M1, M2. The antenna system A1 may for instance comprise a vertically disposed transmitting dipole D, continuously fed from the high frequency generator Tr, and two reflector dipoles R1, R2 which are keyed alternately, the arrangement being of the kind disclosed in U. S. Patent 2,028,510. The keying of the reflector is in a well known manner effected by working and resting relays which are controlled by the keying switch T. The arrangement may also be such that the simple dipole D is replaced by a directional antenna system which acts to produce a bunched vertically polarized radiation. The guide beam is defined by the line of equal signal intensity of two directional characteristics overlapping each other.

The transmitting system A2 for emitting the horizontally polarized glide path radiation is a directional antenna system that comprises a number of horizontal dipoles D1 to D6, Fig. 2, which are located in a plane slightly inclined with respect to the earth's surface. This antenna system emits a bunched radiation in the direction of the landing path, the aircraft gliding downward on a line of constant transmitter field intensity. The vertical dipole D shown in Fig. 1 may be replaced by a bunched system comprising vertical antenna V1 to V5, as shown in Fig. 2.

The arrangement shown in Fig. 3 is simple inasmuch as a single or common final transmitter stage may be employed for both antenna systems, the modulation being effected by absorption means disposed in the energy lines. The absorption means here shown by way of example are electron tubes R1', R2'. These are preferably arranged in a potential loop or antinode of the stationary waves originated in the energy line, and are influenced by the audible frequency generators M1, M2 in the rhythm of the audible frequencies $f1$, $f2$. In this way a simple and cheap separate modulation of the two differently polarized radiations is rendered possible while at the same time a reaction on the transmitter is avoided. However, instead of the described mode of modulating any other suitable modulating method may be adopted.

In the arrangement shown in Fig. 4 the two differently polarized antenna systems are fed by means of wavelengths which are in immediate neighbourhood of each other and are generated in a transmitter common to these systems. This transmitter has a prestage V, an intermediate stage Z, and a final stage E. Stage V comprises a control transmitter 1, a beat frequency oscillator 2, and a modulating part 3. The control transmitter acts to produce a frequency of say 40 mc. This frequency is modulated in part 3 with a beat frequency Zf of say 20,000 cycles per second, this frequency being generated in oscillator 2. In this way, the two side bands 40 mc.+20,000 cycles and 40 mc.—20,000 cycles are obtained. These side bands are segregated from each other and then conveyed to stage Z. Here the two side bands are separately amplified in amplifiers 4, 5 and are in modulation generators 6, 7 modulated with different audible frequencies, one side band being modulated with say 1000 cycles and the other modulated with 2000 cycles. In stage E the two side bands are reunited. They are here amplified by an amplifier 8 of large output and are then segregated by filters 9, 10, whence they are separately conveyed to the two antenna systems A1, A2. Stage E is possessed of a band width that equals the distance of the two side bands.

As will be seen from Fig. 5, antenna system A1 produces the vertically polarized guide beam L, this result being obtained by keying the two radiation diagrams C1, C2 alternately. Antenna system A2 produces the horizontally polarized bunched glide path diagram G. Both transmitting arrangements are, as stated before, fed from the single transmitter Tr. The two antenna systems are so located that the guide beam L extends at a certain angle to the glide path radiation G, thus providing for an advantageous glide path curve.

For the reception of the two differently polarized radiations, in systems as provided by the invention a single receiving device is employed, which is shown in Fig. 6. The receiving arrangement here represented has a horizontal dipole H that serves to receive the horizontally polarized glide path radiation. This arrangement also has a vertical dipole V, intended for the reception of the vertically polarized guide beam. Both dipoles are connected to the input side of the receiver R. Receiver R comprises high frequency amplifying tubes for amplifying the two radiations conjointly and also comprises a rectifier whose characteristic curve is as far as possible linear in order to prevent the two differently polarized radiations from modulating each other. After the rectifier and means for low frequency amplification, if any, the two filters S1, S2 are disposed which serve to segregate the audible frequencies $f1$, $f2$ allotted to the radiations. The audible frequency of the guide beam can only pass through one of these filters while that of the glide path radiation can pass through the other filter only. The lateral deviations of the aircraft from the guide beam are in a well known manner indicated by an instrument J1, while the curve of constant field intensity of the glide path is indicated by instrument J2. Instrument J1, concerned with indications regarding the guide beam, may be of the kind disclosed in U. S. Patent 2,044,852, being of great sensitiveness in the region of the zero position of its pointer while being of less sensitiveness with the pointer in its outer positions. To this instrument the rectified modulating frequency of the guide beam is conveyed over a transformer. Instrument J2, concerned with indications regarding the glide path, is a customary voltmeter. However, the invention is not restricted to the use of these instruments or indicating methods, but other instruments or methods may be employed here, as may be desired or necessary for any reasons.

For the reception from the transmitting system shown in Fig. 4, and which employs wavelengths which are in immediate neighbourhood of each other, a receiving arrangement similar to that represented in Fig. 6, is employed. It is here only necessary to provide the high frequency part with band filters, the band width of which equals the frequency distance of the two side bands of the transmitter. In this way the two neighbouring wavelengths may be received simultaneously by a single receiving arrangement.

What is claimed is:

1. A system for guiding an aircraft to a landing surface along a glide path indicated by constant intensity received glide path signals, comprising a first ultra-short wave system for emitting a runway localizer beam over said landing surface in a predetermined horizontal direction to provide horizontal guidance for said aircraft during landing, and a second ultra-short wave system for emitting waves forming a glide path radiation pattern over said landing surface to provide vertical guidance for said aircraft during landing, said second system being laterally spaced from the beam axis of said first system and being positioned so that the axis of said glide path radiation pattern is directed over said landing surface at an angle with respect to the horizontal direction of said localizer beam to define together a desired landing curve traversing said glide radiation pattern in a vertical plane at an angle to the axis of said pattern.

2. A system according to claim 1, wherein the ultra-short wave system for emitting a guide beam is polarized vertically while the ultra-short wave system for emitting a glide path radiation is polarized horizontally.

3. A system according to claim 2, further comprising means for energizing both said systems with energy of the same wavelength.

4. A system according to claim 1, having a single transmitter for feeding the radiations conjointly to said first and second systems, said transmitter comprising a common prestage and two separate final stages for modulating the radiations separately with different audible frequencies.

5. A system according to claim 1, having means for causing the two radiations to operate on wavelengths which are in immediate neighbourhood of each other.

6. A system according to claim 1 in which a single control transmitter is provided to derive said two radiations, said control transmitter having a local source of oscillations for modulating it to derive two side bands, and means for controlling said two emitters respectively by said side bands.

7. A system for aircraft landing, comprising an ultra-short wave system for emitting a run-way localizer beam radiation in a predetermined azimuthal direction, another ultra-short wave system for emitting a glide path radiation directed in a different predetermined azimuthal direction intersecting said localizer path radiation, both said emitters operating on closely adjacent wave lengths but being differently polarized, a control transmitter common to both said emitters, means to modulate said control transmitter to derive two side bands, means to modulate each of said side bands with different individual audio frequencies, and means to feed said individually modulated side bands respectively to each of said emitters.

8. A system according to claim 7 in which an intermediate transmitter stage is provided to amplify said two side bands, said intermediate stage feeding a single stage having a band width equal to the frequency width between the side bands, and a pair of filter systems for the said side bands and located between said single stage and said emitters.

9. A system for guiding aircraft according to claim 1, wherein said first ultra-short wave system comprises a vertical dipole, means for feeding said dipole continuously, vertical reflectors associated with said dipole, and means for keying said reflectors alternately, and said second system comprises a group of horizontal dipoles arranged in a plane slightly inclined to the earth's surface.

10. A system for guiding aircraft according to claim 1, wherein said first ultra-short wave system comprises a vertical bunched antenna arrangement, means for feeding said antenna arrangement continuously, vertical reflectors associated with said arrangement, and means for keying said reflectors alternately, and said second system comprises a group of horizontal dipoles arranged in a plane slightly inclined to the earth's surface.

11. A system according to claim 7 in which a common amplifier is provided for amplifying the two side bands, and the output of said amplifier is separately filtered to feed said emitters separately.

12. A system for guiding aircraft according to claim 1, further comprising a control transmitter common to both said ultra-short wave systems to feed energy thereto conjointly, and means operatively associated with said systems to modulate the energy thereof at different audio-frequencies.

13. A system for guiding aircraft according to claim 1, comprising a control transmitter common to both said ultra-short wave systems to feed energy thereto conjointly, and absorption modulation means operatively associated with said systems to modulate the energy thereof at different audio-frequencies.

WALTER MAX HAHNEMANN.